(12) United States Patent
Trimponias et al.

(10) Patent No.: US 11,252,077 B2
(45) Date of Patent: Feb. 15, 2022

(54) NETWORK SERVICE TRANSMISSION METHOD AND SYSTEM

(71) Applicant: Huawei Technologies Co., Ltd., Shenzhen (CN)

(72) Inventors: Georgios Trimponias, Hong Kong (CN); Hong Xu, Hong Kong (CN); Zhitang Chen, Hong Kong (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 213 days.

(21) Appl. No.: 16/569,239

(22) Filed: Sep. 12, 2019

(65) Prior Publication Data

US 2020/0007433 A1    Jan. 2, 2020

Related U.S. Application Data

(63) Continuation of application No. PCT/CN2017/115328, filed on Dec. 8, 2017.

(30) Foreign Application Priority Data

Mar. 14, 2017    (CN) .......................... 201710149180.3

(51) Int. Cl.
*H04L 12/721*    (2013.01)
*H04L 12/24*    (2006.01)
(Continued)

(52) U.S. Cl.
CPC ............ *H04L 45/124* (2013.01); *H04L 41/12* (2013.01); *H04L 45/24* (2013.01); *H04L 47/125* (2013.01)

(58) Field of Classification Search
CPC ....... H04L 45/124; H04L 41/12; H04L 45/24; H04L 47/125; H04L 41/0893; H04L 41/0896; H04L 45/12; H04L 45/02
See application file for complete search history.

(56) References Cited

U.S. PATENT DOCUMENTS

| 6,584,071 B1 * | 6/2003 | Kodialam | ............... H04L 45/02 370/238 |
| 6,778,531 B1 * | 8/2004 | Kodialam | ............... H04L 12/18 370/256 |

(Continued)

FOREIGN PATENT DOCUMENTS

| CN | 102223671 A | 10/2011 |
| CN | 103036792 A | 4/2013 |

(Continued)

OTHER PUBLICATIONS

Machine Translation and Abstract of Chinese Publication No. CN102223671, Oct. 19, 2011, 41 pages.

(Continued)

*Primary Examiner* — Ivan O Latorre
(74) *Attorney, Agent, or Firm* — Conley Rose, P.C.

(57) ABSTRACT

A network service transmission method includes obtaining network topology information and network service information, and determining a node centrality of each node in a set of other nodes; determining at least one segment node in the set of other nodes, determining at least one transmission path used to transmit each network service; and determining traffic of a network service that is to be transmitted on the at least one transmission path used to transmit the network service. After the segment node is determined, traffic of a network service transmitted on each transmission path is determined, and the transmission paths of the network services share the same segment node.

20 Claims, 2 Drawing Sheets

(51) Int. Cl.
*H04L 12/707* (2013.01)
*H04L 12/803* (2013.01)

(56) References Cited

U.S. PATENT DOCUMENTS

| | | | | |
|---|---|---|---|---|
| 7,610,367 | B2* | 10/2009 | Canright | H04L 41/12 709/223 |
| 8,027,245 | B2* | 9/2011 | Kodialam | H04L 47/125 370/216 |
| 9,225,629 | B2* | 12/2015 | Lindem, III | H04L 45/22 |
| 10,158,566 | B2* | 12/2018 | Lakshmikanthan | H04L 45/507 |
| 10,412,023 | B2* | 9/2019 | Xu | H04L 47/564 |
| 2004/0049595 | A1* | 3/2004 | Sun | H04L 45/00 709/238 |
| 2005/0271060 | A1* | 12/2005 | Kodialam | H04L 45/04 370/394 |
| 2008/0317183 | A1* | 12/2008 | Luo | H04J 3/0679 375/356 |
| 2010/0260177 | A1 | 10/2010 | Wu et al. | |
| 2013/0121340 | A1* | 5/2013 | Papadimitriou | H04L 45/02 370/410 |
| 2013/0163471 | A1* | 6/2013 | Indukuri | G06Q 10/00 370/255 |
| 2013/0339290 | A1* | 12/2013 | Lee | G06F 17/10 706/55 |
| 2014/0075002 | A1* | 3/2014 | Pradhan | H04L 67/306 709/223 |
| 2014/0098673 | A1* | 4/2014 | Lee | H04L 45/126 370/238 |
| 2014/0156826 | A1* | 6/2014 | Chang | H04L 45/02 709/224 |
| 2014/0226525 | A1* | 8/2014 | Eastlake, III | H04L 41/12 370/254 |
| 2014/0241366 | A1* | 8/2014 | Smith | H04L 45/74 370/392 |
| 2015/0023354 | A1* | 1/2015 | Li | H04L 47/724 370/392 |
| 2015/0180778 | A1* | 6/2015 | Shraer | H04L 49/356 370/238 |
| 2015/0195190 | A1* | 7/2015 | Shah Heydari | G06F 11/3006 714/47.3 |
| 2015/0208316 | A1* | 7/2015 | Mosko | H04L 45/02 370/238 |
| 2015/0208318 | A1* | 7/2015 | Mosko | H04L 41/12 370/310 |
| 2015/0334002 | A1* | 11/2015 | Jogalekar | H04L 45/38 370/238 |
| 2016/0149816 | A1* | 5/2016 | Wu | H04L 47/125 370/235 |
| 2016/0248680 | A1 | 8/2016 | Filsfils et al. | |
| 2016/0261495 | A1* | 9/2016 | Xia | H04L 45/12 |
| 2017/0171066 | A1* | 6/2017 | Hao | H04L 45/125 |
| 2018/0191590 | A1* | 7/2018 | Westphal | H04L 43/0811 |

FOREIGN PATENT DOCUMENTS

| | | |
|---|---|---|
| CN | 104009915 A | 8/2014 |
| CN | 104283789 A | 1/2015 |

OTHER PUBLICATIONS

Machine Translation and Abstract of Chinese Publication No. CN103036792, Apr. 10, 2013, 21 pages.
Machine Translation and Abstract of Chinese Publication No. CN104009915, Aug. 27, 2014, 14 pages.
Machine Translation and Abstract of Chinese Publication No. CN104283789, Jan. 14, 2015, 29 pages.
Bhatia, R., et al., "Optimized Network Traffic Engineering using Segment Routing," IEEE Conference on Computer Communications (INFOCOM), 2015, pp. 657-665.
Hariert, R., et al. "Solving Segment Routing Problems with Hybrid Constraint Programming Techniques," International Conference on Principles and Practice of Constraint Programming, 2015, 18 pages.
Foreign Communication From A Counterpart Application, Chinese Application No. 201710149180.3, Chinese Office Action dated Jul. 30, 2019, 5 pages.
Foreign Communication From A Counterpart Application, PCT Application No. PCT/CN2017/115328, English Translation of International Search Report dated Feb. 24, 2018, 2 pages.
Foreign Communication From A Counterpart Application, PCT Application No. PCT/CN2017/115328, English Translation of Written Opinion dated Feb. 24, 2018, 3 pages.

* cited by examiner

NETWORK SERVICE TRANSMISSION METHOD AND SYSTEM

CROSS-REFERENCE TO RELATED APPLICATIONS

This application is a continuation application of International Application No. PCT/CN2017/115328, filed on Dec. 8, 2017, which claims priority to Chinese Patent Application 201710149180.3, filed on Mar. 14, 2017. The disclosures of the aforementioned applications are hereby incorporated by reference in their entireties.

TECHNICAL FIELD

This application relates to the field of communications technologies, and in particular, to a network service transmission method and system.

BACKGROUND

When a network service needs to be transmitted in a network, usually, a shortest transmission path that is between a source node and a destination node and that is of the network service that needs to be transmitted is determined based on a topology structure between nodes in the network. Then, the source node sends, to the destination node through the shortest transmission path, the network service that needs to be transmitted. However, when a quantity of nodes in the network is relatively large, or the network topology structure is relatively complex, and a quantity of network services that need to be transmitted is relatively large, directly determining the shortest transmission path that is between the source node and the destination node and that is of the network service that needs to be transmitted consumes a relatively heavy calculation workload and is relatively complex.

To reduce the workload of determining the shortest transmission path that is between the source node and the destination node and that is of the network service that needs to be transmitted, a routing solution using segment routing is provided. For example, a transmission path between the source node and the destination node is divided into at least two segment paths by determining one or more segment nodes between the source node and the destination node. The segment node is an intermediate node that the transmission path between the source node and the destination node passes through. Then, a node on each segment path is determined. However, in the prior art, determining of the segment node and determining of traffic splitting ratios on a plurality of paths including the source node, the segment node, and the destination node are unified into to one optimization problem to be resolved. The optimization problem is a problem mixing integer programming and linear programming. Therefore, the calculation workload is still relatively heavy, and it is very difficult to obtain a result through calculation within a limited time.

Therefore, in conclusion, in the prior art, programming of a transmission path of a network service is relatively complex.

SUMMARY

Embodiments of this application provide a network service transmission method and system, to alleviate a problem that programming of a transmission path of a network service in the prior art is relatively complex.

According to a first aspect, a network service transmission method is provided. The method includes obtaining network topology information and network service information, where the network topology information comprises nodes in a network and a connection relationship between the nodes, and the network service information comprises traffic information of at least one network service that needs to be transmitted and a source node and a destination node that are configured to transmit each of the at least one network service; determining a node centrality of each node in a set of other nodes based on the network topology information and the source node and the destination node that are comprised in the network service information and that are configured to transmit the at least one network service, where the node centrality is used to indicate a possibility that a shortest transmission path between the source node and the destination node passes through a node, the set of other nodes does not comprise the source node and the destination node, and the nodes in the set of other nodes are nodes in the network; determining at least one segment node in the set of other nodes based on the node centrality of each node in the set of other nodes, where the segment node is an intermediate node that shortest transmission paths of the at least one network service pass through; determining, based on the source node and the destination node of each of the at least one network service and the at least one segment node, at least one transmission path used to transmit the at least one network service; and determining, based on the traffic information of the at least one network service and the at least one transmission path used to transmit the at least one network service, traffic of a network service that needs to be transmitted on the at least one transmission path used to transmit the network service.

In this application, after the segment node is determined, traffic of a network service transmitted on each transmission path is determined, and the transmission paths of the network services share the same segment node. Therefore, complexity of programming of the transmission path of the network service is reduced to some extent compared with unifying determining of the segment node and determining of the traffic of the network service transmitted on each transmission path into one optimization problem to be resolved in the prior art.

In a possible implementation, the nodes in the set of other nodes are sorted based on values of the node centralities, to obtain nodes ranked top K; and the nodes ranked top K are determined as the at least one segment node, where K is a positive integer greater than or equal to 1.

In a possible implementation, the node centrality of the node in the set of other nodes satisfies the following expression.

$$\delta(v) = \sum_{s,t \in V | s \neq v \neq t} \frac{\sigma_{st}(v)}{\sigma_{st}},$$

where V represents a set of all the nodes in the network; v represents any node in the set of other nodes, and the set of other nodes includes the nodes in the network other than the source node and the destination node; s represents a source node configured to transmit one of the at least one network service; t is used to represent a destination node configured to receive the one network service; $\delta(v)$ is used to represent a node centrality of v; $\sigma_{st}$ is used to represent a quantity of shortest transmission paths between s and t in the network;

and $\sigma_{st}(v)$ is used to represent a quantity of shortest transmission paths passing through v in the $\sigma_{st}$ shortest transmission paths.

The node centrality is determined based on the foregoing manner such that calculation complexity is simplified and efficiency of determining the segment node in the network is improved.

In a possible implementation, the node centrality of the node in the set of other nodes satisfies the following expression.

$$\delta(v) = \frac{|v^- + v^+|}{2}, v \in V',$$

where v represents any node in the set of other nodes; V' represents the set of other nodes, and the node included in the set of other nodes is a node that the shortest transmission paths used to transmit all the network services pass through in the network other than the source node and the destination node; $\delta(v)$ represents a node centrality of v; $v^-$ represents a quantity of nodes in the network that are in ingress connection to v; and $v^+$ represents a quantity of nodes in the network that are in egress connection to v.

In a possible implementation, a group centrality of each node group included in the set of other nodes is determined based on the node centrality of each node in the set of other nodes, where the node group includes J nodes, and J is a positive integer greater than or equal to 1; and a node group having a largest group centrality is selected from the node groups, and J nodes included in the node group having the largest group centrality are determined as the at least one segment node.

In a possible implementation, the group centrality of each node group included in the set of other nodes satisfies the following expression.

$$\delta(C) = \sum_{s,t \in V | s \neq v \neq t} \frac{\sigma_{st}(C)}{\sigma_{st}},$$

where V represents a set of all the nodes in the network; C represents a node group in the set of other nodes, and the set of other nodes includes the nodes in the network other than the source node and the destination node; s represents a source node configured to transmit one of the at least one network service; t represents a destination node configured to receive the one network service; $\delta(C)$ represents a group centrality of C; $\sigma_{st}$ represents a quantity of shortest transmission paths between s and t in the network; and $\sigma_{st}(C)$ represents a sum of a quantity of paths passing through each node included in C in the $\sigma_{st}$ shortest transmission paths.

In a possible implementation, a traffic splitting ratio of the network service that needs to be transmitted on the at least one transmission path used to transmit the network service is determined; and the traffic of the network service that needs to be transmitted on the at least one transmission path used to transmit the network service is determined based on the determined traffic splitting ratio and the traffic information of the at least one network service.

In a possible implementation, the traffic splitting ratio of the network service that needs to be transmitted on the at least one transmission path used to transmit the network service satisfies the following expression.

$$\min \theta,$$

$$\sum_{f \in F} \sum_{t \in T_f} \sum_{s \in S_t} \sum_{p \in P_S} x_{f,t} \cdot D_f \frac{I_{p,e}}{P_S} \leq \theta \cdot C_e, \forall e \in E,$$

$$0 \leq x_{f,t} \leq 1, \forall f \in F, t \in T_f,$$

$$\sum_{t \in T_f} x_{f,t} = 1, \forall f \in F,$$

where E is used to represent an edge set in the network, and each edge in the edge set is used to represent a direct connection relationship between two nodes in the network; e is used to represent an edge in the network; F is used to represent the traffic information of the at least one network service that needs to be transmitted; f is used to represent traffic information on a path used to transmit a network service; $T_f$ is used to represent a set of paths used to transmit all the network services; t is used to represent a path of one of the network services; $S_t$ is used to represent a set of segment paths used to transmit all the network services, and the segment path is a path between the source node and the intermediate node or a path between the intermediate node and the destination node; s is used to represent the segment path; $P_S$ is used to represent a set of shortest segment paths, and the shortest segment path is a shortest path between the source node and the intermediate node or a shortest path between the intermediate node and the destination node; P is used to represent the shortest segment path; $x_{f,t}$ is used to represent a traffic splitting ratio; $D_f$ is used to represent a bandwidth requirement of the traffic information f; $I_{p,e}$ is used to represent a possibility that the edge e is an edge in the shortest segment path; $C_e$ is used to represent a value of maximum service traffic that the edge e can carry; and θ is used to represent a preset ratio value.

The traffic splitting ratio is determined based on the foregoing manner such that a possibility that traffic on each transmission path in the network is beyond a maximum load limit is reduced while calculation is simplified, thereby greatly improving network service transmission efficiency.

According to a second aspect, a network service transmission system is provided. The system includes a segment node determining module configured to determine a node centrality of each node in a set of other nodes based on the network topology information and the source node and the destination node that are comprised in the network service information and that are configured to transmit the at least one network service, wherein the node centrality is used to indicate a possibility that a shortest transmission path between the source node and the destination node passes through a node, the set of other nodes does not comprise the source node and the destination node, and the nodes in the set of other nodes are nodes in the network; and determine at least one segment node in the set of other nodes based on the node centrality of each node in the set of other nodes, wherein the segment node is an intermediate node that shortest transmission paths of the at least one network service pass through; and a service traffic determining module configured to determine, based on the source node and the destination node of each of the at least one network service and the at least one segment node, at least one transmission path used to transmit each network service; and determine, based on the traffic information of the at least one network service and the at least one transmission path used to transmit the at least one network service, traffic of a network service that needs to be transmitted on the at least one transmission path used to transmit the at least one network service.

In a possible implementation, the segment node determining module is further configured to sort the nodes in the set of other nodes based on values of the node centralities, to obtain nodes ranked top K; and determine the nodes ranked top K as the at least one segment node, where K is a positive integer greater than or equal to 1.

In a possible implementation, the node centrality of the node in the set of other nodes satisfies the following expression.

$$\delta(v) = \sum_{s,t \in V | s \neq v \neq t} \frac{\sigma_{st}(v)}{\sigma_{st}},$$

where V represents a set of all the nodes in the network; v represents any node in the set of other nodes, and the set of other nodes includes the nodes in the network other than the source node and the destination node; s represents a source node configured to transmit one of the at least one network service; t is used to represent a destination node configured to receive the one network service; $\delta(v)$ is used to represent a node centrality of v; $\sigma_{st}$ is used to represent a quantity of shortest transmission paths between s and t in the network; and $\sigma_{st}(v)$ is used to represent a quantity of shortest transmission paths passing through v in the $\sigma_{st}$ shortest transmission paths.

In a possible implementation, the node centrality of the node in the set of other nodes satisfies the following expression.

$$\delta(v) = \frac{|v^- + v^+|}{2}, v \in V',$$

where v represents any node in the set of other nodes; V' represents the set of other nodes, and the node included in the set of other nodes is a node that the shortest transmission paths used to transmit all the network services pass through in the network other than the source node and the destination node; $\delta(v)$ represents a node centrality of v; $v^-$ represents a quantity of nodes in the network that are in ingress connection to v; and $v^+$ represents a quantity of nodes in the network that are in egress connection to v.

In a possible implementation, the segment node determining module is further configured to determine, based on the node centrality of each node in the set of other nodes, a group centrality of each node group included in the set of other nodes, where the node group includes J nodes, and J is a positive integer greater than or equal to 1; and select a node group having a largest group centrality from the node groups, and determine J nodes included in the node group having the largest group centrality as the at least one segment node.

In a possible implementation, the group centrality of each node group included in the set of other nodes satisfies the following expression.

$$\delta(C) = \sum_{s,t \in V | s \neq v \neq t} \frac{\sigma_{st}(C)}{\sigma_{st}},$$

where V represents a set of all the nodes in the network; C represents a node group in the set of other nodes, and the set of other nodes includes the nodes in the network other than the source node and the destination node; s represents a source node configured to transmit one of the at least one network service; t represents a destination node configured to receive the one network service; $\delta(C)$ represents a group centrality of C; $\sigma_{st}$ represents a quantity of shortest transmission paths between s and t in the network; and $\sigma_{st}(C)$ represents a sum of a quantity of paths passing through each node included in C in the $\sigma_{st}$ shortest transmission paths.

In a possible implementation, the service traffic determining module is further configured to determine a traffic splitting ratio of the network service that needs to be transmitted on the at least one transmission path used to transmit the network service; and determine, based on the determined traffic splitting ratio and the traffic information of the at least one network service, the traffic of the network service that needs to be transmitted on the at least one transmission path used to transmit the network service.

In a possible implementation, the traffic splitting ratio of the network service that needs to be transmitted on the at least one transmission path used to transmit the network service satisfies the following expression.

$$\min \theta,$$

$$\sum_{f \in F} \sum_{t \in T_f} \sum_{s \in S_t} \sum_{p \in P_S} x_{f,t} \cdot D_f \frac{I_{p,e}}{P_S} \leq \theta \cdot C_e, \forall e \in E,$$

$$0 \leq x_{f,t} \leq 1, \forall f \in F, t \in T_f,$$

$$\sum_{t \in T_f} x_{f,t} = 1, \forall f \in F,$$

where E is used to represent an edge set in the network, and each edge in the edge set is used to represent a direct connection relationship between two nodes in the network; e is used to represent an edge in the network; F is used to represent the traffic information of the at least one network service that needs to be transmitted; f is used to represent traffic information on a path used to transmit a network service; $T_f$ is used to represent a set of paths used to transmit all the network services; t is used to represent a path of one of the network services; $S_t$ is used to represent a set of segment paths used to transmit all the network services, and the segment path is a path between the source node and the intermediate node or a path between the intermediate node and the destination node; s is used to represent the segment path; $P_S$ is used to represent a set of shortest segment paths, and the shortest segment path is a shortest path between the source node and the intermediate node or a shortest path between the intermediate node and the destination node; p is used to represent the shortest segment path; $x_{f,t}$ is used to represent a traffic splitting ratio; $D_f$ is used to represent a bandwidth requirement of the traffic information f; $I_{p,e}$ is used to represent a possibility that the edge e is an edge in the shortest segment path; $C_e$ is used to represent a value of maximum service traffic that the edge e can carry; and $\theta$ is used to represent a preset ratio value.

DESCRIPTION OF EMBODIMENTS

In this application, after a segment node is determined, traffic of a network service transmitted on each transmission path is determined, and the transmission paths of the network services share the same segment node. Therefore, complexity of programming of the transmission path of the network service is reduced to some extent compared with unifying determining of the segment node and determining of the traffic of the network service transmitted on each transmission path into one optimization problem to be resolved in the prior art.

Figure 1:
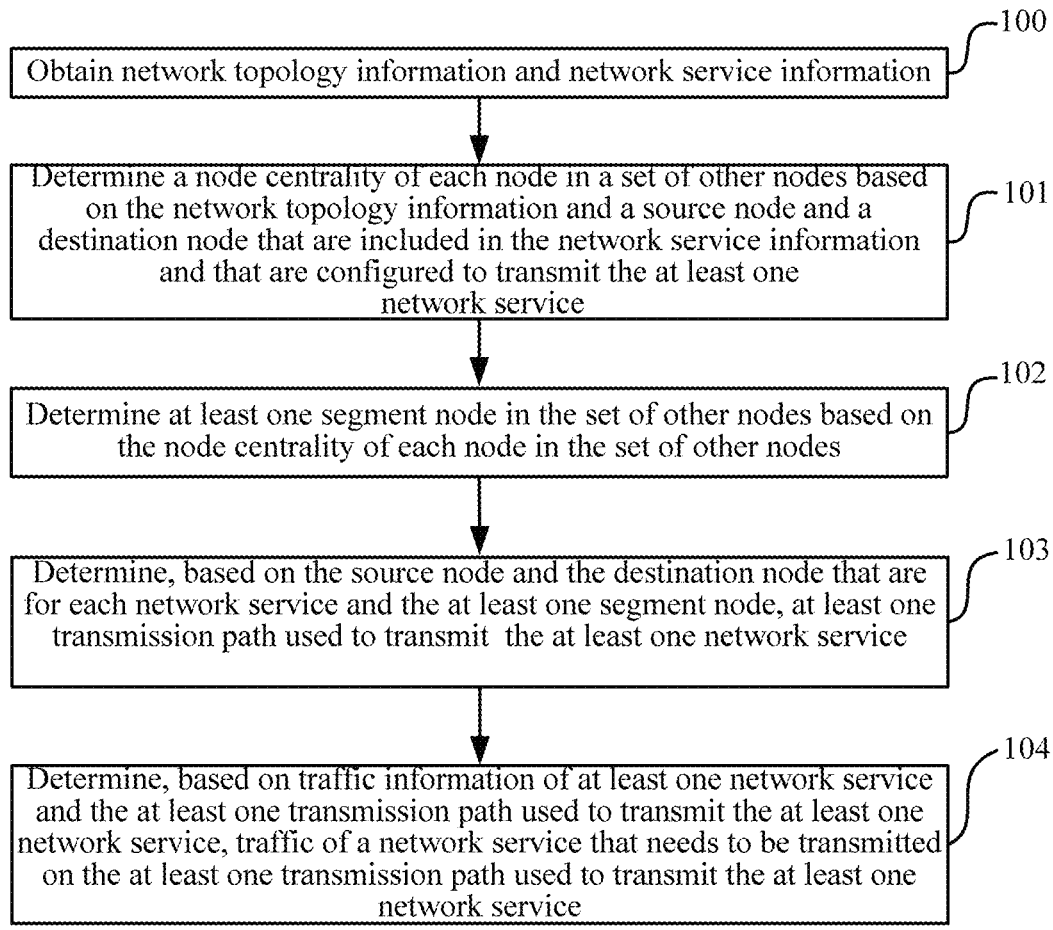
FIG. 1 is a schematic flowchart of a network service transmission method according to an embodiment of this application.

As shown in FIG. 1, a network service transmission method according to an embodiment of this application includes the following steps.

Step 100: Obtain network topology information and network service information, where the network topology information includes nodes in a network and a connection relationship between the nodes, and the network service information includes traffic information of at least one network service that needs to be transmitted and a source node and a destination node that are configured to transmit each of the at least one network service.

Further, the network topology information and the network service information may be periodically obtained from an SDN controller.

Step 101: Determine a node centrality of each node in a set of other nodes based on the network topology information and the source node and the destination node that are included in the network service information and that are configured to transmit each network service, where the node centrality is used to indicate a possibility that a shortest transmission path between the source node and the destination node passes through a node, the set of other nodes does not include the source node and the destination node, and the nodes in the set of other nodes are nodes in the network.

Step 102: Determine at least one segment node in the set of other nodes based on the node centrality of each node in the set of other nodes, where the segment node is an intermediate node that shortest transmission paths of all the network services pass through.

Step 103: Determine, based on the source node and the destination node that are for each network service and the at least one segment node, at least one transmission path used to transmit each network service.

Step 104: Determine, based on the traffic information of the at least one network service and the at least one transmission path used to transmit the network service, traffic of a network service that needs to be transmitted on the at least one transmission path used to transmit the network service.

When step 102 is further implemented, the at least one segment node may be determined in the following manner.

The nodes in the set of other nodes are sorted based on values of the node centralities, to obtain nodes ranked top K; and the nodes ranked top K are determined as the at least one segment node, where K is a positive integer greater than or equal to 1. A quantity of segment nodes determined in such a manner is K.

For example, the node centrality of the node in the set of other nodes may satisfy the following expression.

$$\delta(v) = \sum_{s,t \in V | s \neq v \neq t} \frac{\sigma_{st}(v)}{\sigma_{st}},$$

where V represents a set of all the nodes in the network; v represents any node in the set of other nodes, and the set of other nodes includes the nodes in the network other than the source node and the destination node; s represents a source node configured to transmit one of the at least one network service; t is used to represent a destination node configured to receive the one network service; $\delta(v)$ is used to represent a node centrality of v; $\sigma_{st}$ is used to represent a quantity of shortest transmission paths between s and t in the network; and $\sigma_{st}(v)$ is used to represent a quantity of shortest transmission paths passing through v in the $\sigma_{st}$ shortest transmission paths.

Figure 2:
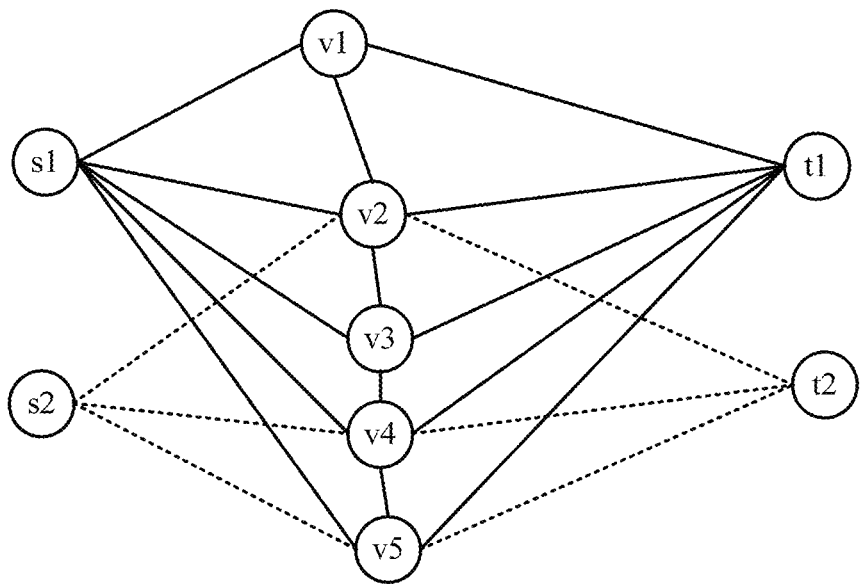
FIG. 2 is a schematic structural diagram of a network topology according to an embodiment of this application.

A network topology structure shown in FIG. 2 is used as an example. It is assumed that s1 is a source node configured to transmit a network service 1, t1 is a destination node configured to receive the network service 1, s2 is a source node configured to transmit a network service 2, and t2 is a destination node configured to receive the network service 2. It may be learned from FIG. 2 that shortest transmission paths between s1 and t1 include s1→v1→t1, s1→v2→t1, s1→v3→t1, s1→v4→t1, and s1→v5→t1, and shortest transmission paths between s2 and t2 include s2→v2→t2, s2→v4→t2, and s2→v5→t2.

A set of other nodes includes v1, v2, v3, v4, and v5. Using v1 as an example, $$\delta(v1) = \frac{\sigma_{s1v1}(v1)}{\sigma_{s1t1}} + \frac{\sigma_{s2v2}(v1)}{\sigma_{s2t2}} = \frac{1}{5}.$$

Likewise, $$\delta(v2) = \frac{8}{15}, \quad \delta(v3) = \frac{1}{5}, \quad \delta(v4) = \frac{8}{15}, \text{ and } \delta(v5) = \frac{8}{15}.$$

Therefore, when the network topology structure is shown in FIG. 2, and the source nodes and the destination nodes are respectively s1 and t1, and s2 and t2, if nodes whose node centralities are ranked top 3 are selected as segment nodes, the segment nodes are respectively v2, v4, and v5, transmission paths of the network service 1 are respectively s1→v2→t1, s1→v4→t1, and s1→v5→t1, and transmission paths of the network service 2 are respectively s2→v2→t2, s2→v4→t2, and s2→v5→t2; or if nodes whose node centralities are ranked top 2 are selected as segment nodes, because the node centralities ranked top 3 are equal, the segment nodes may be any two of v2, v4, and v5. It should be noted that in this embodiment of this application, a value of K may be set based on an actual requirement.

For example, the node centrality of each node in the set of other nodes satisfies the following expression.

$$\delta(v) = \frac{|v^- + v^+|}{2}, v \in V',$$

where v represents any node in the set of other nodes; V' represents the set of other nodes, and the node included in the set of other nodes is a node that the shortest transmission paths used to transmit all the network services pass through in the network other than the source node and the destination node; δ(v) represents a node centrality of v; v⁻ represents a quantity of nodes in the network that are in ingress connection to v; and v⁺ represents a quantity of nodes in the network that are in egress connection to v.

A network topology structure shown in FIG. 2 is used as an example. It is assumed that s1 is a source node configured to transmit a network service 1, t1 is a destination node configured to receive the network service 1, s2 is a source node configured to transmit a network service 2, and t2 is a destination node configured to receive the network service 2. It may be learned from FIG. 2 that shortest transmission paths between s1 and t1 include s1→v1→t1, s1→v2→t1, s1→v3→t1, s1→v4→t1, and s1→v5→t1, and shortest transmission paths between s2 and t2 include s2→v2→t2, s2→v4→t2, and s2→v5→t2.

A set of other nodes includes v2, v4, and v5. Using v2 as an example, ingress nodes of v2 are s1, s2, and v2, egress nodes of v2 are v4, t1, and t2 such that $$\delta(v2) = \frac{3+3}{2} = 3.$$

Likewise, δ(v4)=3, and $$\delta(v5) = \frac{5}{2}.$$

Therefore, when the network topology structure is shown in FIG. 2, and the source nodes and the destination nodes are respectively s1 and t1, and s2 and t2, if nodes whose node centralities are ranked top 3 are selected as segment nodes, the segment nodes are v2, v4, and v5, transmission paths of the network service 1 are respectively s1→v2→t1, s1→v4→t1, and s1→v5→t1, and transmission paths of the network service 2 are respectively s2→v2→t2, s2→v4→t2, and s2→v5→t2; or if nodes whose node centralities are ranked top 2 are selected as segment nodes, the segment nodes are v2 and v4. It should be noted that in this embodiment of this application, a value of K may be set based on an actual requirement.

In addition, in this embodiment of this application, a group centrality of each node group included in the set of other nodes may further be determined based on the node centrality of each node in the set of other nodes. The node group includes J nodes, and J is a positive integer greater than or equal to 1. A node group having a largest group centrality is selected from the node groups, and J nodes included in the node group having the largest group centrality are determined as the at least one segment node. A quantity of the at least one segment node determined in such a manner is J. A value of J may be correspondingly set based on a requirement.

Further, the group centrality of each node group included in the set of other nodes satisfies the following expression.

$$\delta(C) = \sum_{s,t \in V | s \neq v \neq t} \frac{\sigma_{st}(C)}{\sigma_{st}},$$

where V represents a set of all the nodes in the network; C represents a node group in the set of other nodes, and the set of other nodes includes the nodes in the network other than the source node and the destination node; s represents a source node configured to transmit one of the at least one network service; t represents a destination node configured to receive the one network service; δ(C) represents a group centrality of C; $\sigma_{st}$ represents a quantity of shortest transmission paths between s and t in the network; and $\sigma_{st}(C)$ represents a sum of a quantity of paths passing through each node included in C in the $\sigma_{st}$ shortest transmission paths.

It should be understood that usually, quantities of nodes included in the node groups are the same, and the quantity of nodes included in each node group is a quantity of segment nodes that need to be determined. For example, if three segment nodes need to be determined, each node group includes three nodes, and if four segment nodes need to be determined, each node group includes four nodes. Nodes included in each node group are not completely the same. The quantity of nodes included in each node group is set based on an actual requirement.

A network topology structure shown in FIG. 2 is used as an example. It is assumed that s1 is a source node configured to transmit a network service 1, t1 is a destination node configured to receive the network service 1, s2 is a source node configured to transmit a network service 2, and t2 is a destination node configured to receive the network service 2. It may be learned from FIG. 2 that shortest transmission paths between s1 and t1 include s1→v1→t1, s1→v2→t1, s1→v3→t1, s1→v4→t1, and s1→v5→t1, and shortest transmission paths between s2 and t2 include s2→v2→t2, s2→v4→t2, and s2→v5→t2.

A set of other nodes includes v1, v2, v3, v4, and v5. If a node group includes three nodes, 10 possible node groups are included in total. For example, a node group consists of v1, v2, and v3, and a node group consists of v2, v3, and v4. An example in which a node group consists of v1, v2, and v3 is used.

$$\delta(v1) = \frac{1}{5}, \delta(v2) = \frac{8}{15}, \delta(v3) = \frac{1}{5}, \delta(v4) = \frac{8}{15}, \text{ and } \delta(v5) = \frac{8}{15}.$$

Therefore, $$\delta(C1) = \delta(v1) + \delta(v2) + \delta(v3) = \frac{14}{15}.$$

In v1, v2, v3, v4, and v5, node centralities of v2, v4, and v5 are largest. Therefore, a group centrality of a node group consisting of v2, v4, and v5 is the largest. Therefore, segment nodes are determined as v2, v4, and v5. It should be noted that in this embodiment of this application, a value of K may be set based on an actual requirement.

To simplify an implementation of step 104, in this embodiment of this application, a traffic splitting ratio of the network service that needs to be transmitted on the at least one transmission path used to transmit the network service is determined first; and then the traffic of the network service that needs to be transmitted on the at least one transmission path used to transmit the network service is determined based on the determined traffic splitting ratio and the traffic information of the at least one network service.

Further, the traffic splitting ratio of the network service that needs to be transmitted on the at least one transmission path used to transmit the network service satisfies the following expression.

$$\min \theta,$$

$$\sum_{f \in F} \sum_{t \in T_f} \sum_{s \in S_t} \sum_{p \in P_S} x_{f,t} \cdot D_f \frac{I_{p,e}}{P_S} \leq \theta \cdot C_e, \forall e \in E,$$

$$0 \leq x_{f,t} \leq 1, \forall f \in F, t \in T_f,$$

$$\sum_{t \in T_f} x_{f,t} = 1, \forall f \in F,$$

where E is used to represent an edge set in the network, and each edge in the edge set is used to represent a direct connection relationship between two nodes in the network; e is used to represent an edge in the network; F is used to represent the traffic information of the at least one network service that needs to be transmitted; f is used to represent traffic information on a path used to transmit a network service; $T_f$ is used to represent a set of paths used to transmit all the network services; t is used to represent a path of one of the network services; $S_t$ is used to represent a set of segment paths used to transmit all the network services, and the segment path is a path between the source node and the intermediate node or a path between the intermediate node and the destination node; s is used to represent the segment path; $P_S$ is used to represent a set of shortest segment paths, and the shortest segment path is a shortest path between the source node and the intermediate node or a shortest path between the intermediate node and the destination node; P is used to represent the shortest segment path; $x_{f,t}$ is used to represent a traffic splitting ratio; $D_f$ is used to represent a bandwidth requirement of the traffic information f; $I_{p,e}$ is used to represent a possibility that the edge e is an edge in the shortest segment path; $C_e$ is used to represent a value of maximum service traffic that the edge e can carry; and θ is used to represent a preset ratio value.

FIG. 2 is used as an example. It is assumed that s1 is a source node configured to transmit a network service 1, t1 is a destination node configured to receive the network service 1, s2 is a source node configured to transmit a network service 2, and t2 is a destination node configured to receive the network service 2. Transmission paths of the network service 1 are respectively s1→v2→t1, s1→v4→t1, and s1→v5→t1, and transmission paths of the network service 2 are respectively s2→v2→t2, s2→v4→t2, and s2→v5→t2. According to the expression in this embodiment of this application, traffic of a network service transmitted on each transmission path is enabled to be not beyond maximum capacities of edges of the transmission path. Using the transmission path s1→v2→t1 of the network service 1 as an example, s1→v2 is an edge.

To verify effectiveness of this embodiment of this application, three network topologies (synth50, synth100, and rf3257) are used to perform analog simulation. synth50 and synth100 are networks artificially generated, and rf3257 is a real network topology. Parameters of the three network topologies are shown in the following table.

TABLE 1

| Network topology structure | Node quantity | Links | Network service |
|---|---|---|---|
| synth50 | 50 | 276 | 2449 |
| synth100 | 100 | 572 | 9817 |
| rf3257 | 161 | 656 | 25486 |

Figure 3:
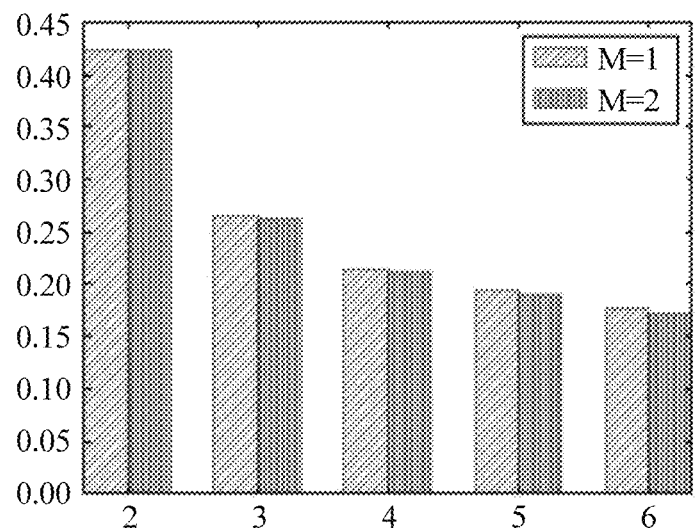
FIG. 3 is a schematic diagram of network service performance analysis according to an embodiment of this application.

As shown in FIG. 3, a horizontal axis indicates a quantity of determined segment nodes in a transmission path used to transmit a network service in a network, and a vertical axis indicates utilization of each edge. FIG. 3 shows use conditions of edges in a transmission path when it is determined that there is one segment node and there are two segment nodes in the transmission path. A smaller value of the vertical axis indicates a better load balancing effect of a routing algorithm. It may be learned from FIG. 3 that load balancing effects are similar when there are two segment nodes and when there is one segment node. However, determining two segment nodes is more complex than determining one segment node.

For a large-scale network, according to the implementation of this embodiment of this application, only 2.5% to 5% nodes need to be selected from the network as segment nodes such that good load balancing can be implemented.

Based on a same concept, an embodiment of this application further provides a network service transmission system. A method corresponding to the network service transmission system in this embodiment of this application is the network service transmission method in the embodiments of this application. Therefore, for implementation of the network service transmission system in this embodiment of this application, refer to implementation of the method, and repetitions are not described again.

Figure 4:
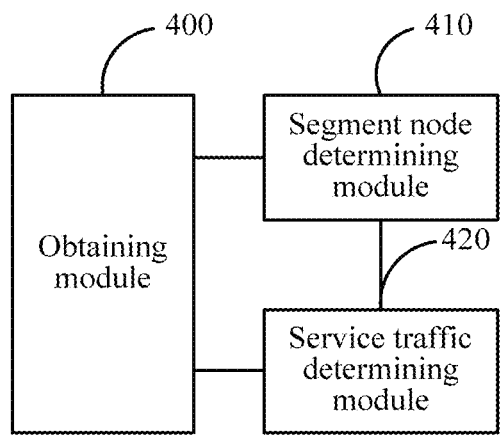
FIG. 4 is a schematic structural diagram of a network service transmission system according to an embodiment of this application.

As shown in FIG. 4, the network service transmission system according to this embodiment of this application includes an obtaining module 400 configured to obtain network topology information and network service information, where the network topology information includes nodes in a network and a connection relationship between the nodes, and the network service information includes traffic information of at least one network service that needs to be transmitted and a source node and a destination node that are configured to transmit each of the at least one network service; a segment node determining module 410 configured to determine a node centrality of each node in a set of other nodes based on the network topology information and the source node and the destination node that are included in the network service information and that are configured to transmit each network service, where the node centrality is used to indicate a possibility that a shortest transmission path between the source node and the destination node passes through a node, the set of other nodes does not include the source node and the destination node, and the nodes in the set of other nodes are nodes in the network; and determine at least one segment node in the set of other nodes based on the node centrality of each node in the set of other nodes, where the segment node is an intermediate node that shortest transmission paths of all the network services pass through; and a service traffic determining module 420 configured to determine, based on the source node and the destination node that are for each network service and the at least one segment node, at least one transmission path used to transmit each network service; and determine, based on the traffic information of the at least one network service and the at least one transmission path used to transmit the network service, traffic of a network service that needs to be transmitted on the at least one transmission path used to transmit the network service.

It should be noted that each of the obtaining module 400, the segment node determining module 410, and the service traffic determining module 420 may be a physical device having a sending and receiving function and a processing function. Alternatively, the obtaining module 400, the segment node determining module 410, and the service traffic determining module 420 may be all integrated into a physical device having a sending and receiving function and a processing function. Alternatively, any two of the obtaining module 400, the segment node determining module 410, and the service traffic determining module 420 are both integrated into a physical device having a sending and receiving function and a processing function. This is not limited in this application.

In a possible implementation, the segment node determining module 410 is further configured to sort the nodes in the set of other nodes based on values of the node centralities, to obtain nodes ranked top K; and determine the nodes ranked top K as the at least one segment node, where K is a positive integer greater than or equal to 1.

In a possible implementation, the node centrality of the node in the set of other nodes satisfies the following expression.

$$\delta(v) = \sum_{s,t \in V | s \neq v \neq t} \frac{\sigma_{st}(v)}{\sigma_{st}},$$

where V represents a set of all the nodes in the network; v represents any node in the set of other nodes, and the set of other nodes includes the nodes in the network other than the source node and the destination node; s represents a source node configured to transmit one of the at least one network service; t represents a destination node configured to receive the one network service; $\delta(v)$ is used to represent a node centrality of v; $\sigma_{st}$ is used to represent a quantity of shortest transmission paths between s and t in the network; and $\sigma_{st}(v)$ is used to represent a quantity of shortest transmission paths passing through v in the $\sigma_{st}$ shortest transmission paths.

In a possible implementation, the node centrality of the node in the set of other nodes satisfies the following expression.

$$\delta(v) = \frac{|v^- + v^+|}{2}, v \in V',$$

where v represents any node in the set of other nodes; V' represents the set of other nodes, and the node included in the set of other nodes is a node that the shortest transmission paths used to transmit all the network services pass through in the network other than the source node and the destination node; $\delta(v)$ represents a node centrality of v; $v^-$ represents a quantity of nodes in the network that are in ingress connection to v; and $v^+$ represents a quantity of nodes in the network that are in egress connection to v.

In a possible implementation, the segment node determining module 410 is further configured to determine, based on the node centrality of each node in the set of other nodes, a group centrality of each node group included in the set of other nodes, where the node group includes J nodes, and J is a positive integer greater than or equal to 1; and select a node group having a largest group centrality from the node groups, and determine J nodes included in the node group having the largest group centrality as the at least one segment node.

In a possible implementation, the group centrality of each node group included in the set of other nodes satisfies the following expression.

$$\delta(C) = \sum_{s,t \in V | s \neq v \neq t} \frac{\sigma_{st}(C)}{\sigma_{st}},$$

where V represents a set of all the nodes in the network; C represents a node group in the set of other nodes, and the set of other nodes includes the nodes in the network other than the source node and the destination node; s represents a source node configured to transmit one of the at least one network service; t represents a destination node configured to receive the one network service; $\delta(C)$ represents a group centrality of C; $\sigma_{st}$ represents a quantity of shortest transmission paths between s and t in the network; and $\sigma_{st}(C)$ represents a sum of a quantity of paths passing through each node included in C in the $\sigma_{st}$ shortest transmission paths.

In a possible implementation, the service traffic determining module 420 is further configured to determine a traffic splitting ratio of the network service that needs to be transmitted on the at least one transmission path used to transmit the network service; and determine, based on the determined traffic splitting ratio and the traffic information of the at least one network service, the traffic of the network service that needs to be transmitted on the at least one transmission path used to transmit the network service.

In a possible implementation, the traffic splitting ratio of the network service that needs to be transmitted on the at least one transmission path used to transmit the network service satisfies the following expression.

$$\min \theta,$$

$$\sum_{f \in F} \sum_{t \in T_f} \sum_{s \in S_t} \sum_{p \in P_S} x_{f,t} \cdot D_f \frac{l_{p,e}}{P_S} \leq \theta \cdot C_e, \forall e \in E,$$

$$0 \leq x_{f,t} \leq 1, \forall f \in F, t \in T_f,$$

$$\sum_{t \in T_f} x_{f,t} = 1, \forall f \in F,$$

where E is used to represent an edge set in the network, and each edge in the edge set is used to represent a direct connection relationship between two nodes in the network; e is used to represent an edge in the network; F is used to represent the traffic information of the at least one network service that needs to be transmitted; f is used to represent traffic information on a path used to transmit a network service; $T_f$ is used to represent a set of paths used to transmit all the network services; t is used to represent a path of one of the network services; $S_t$ is used to represent a set of segment paths used to transmit all the network services, and the segment path is a path between the source node and the intermediate node or a path between the intermediate node and the destination node; s is used to represent the segment path; $P_S$ is used to represent a set of shortest segment paths, and the shortest segment path is a shortest path between the source node and the intermediate node or a shortest path between the intermediate node and the destination node; P is used to represent the shortest segment path; $x_{f,t}$ is used to represent a traffic splitting ratio; $D_f$ is used to represent a bandwidth requirement of the traffic information f; $I_{p,e}$ is used to represent a possibility that the edge e is an edge in the shortest segment path; $C_e$ is used to represent a value of maximum service traffic that the edge e can carry; and $\theta$ is used to represent a preset ratio value.

Figure 5:
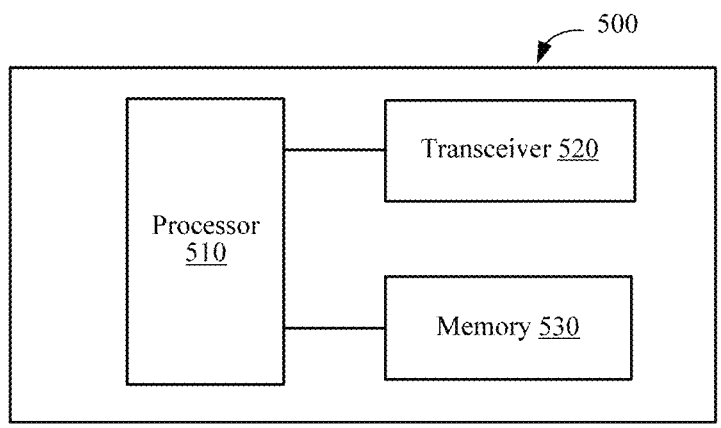
FIG. 5 is a schematic structural diagram of hardware of a network service transmission device according to an embodiment of this application.

When the obtaining module 400, the segment node determining module 410, and the service traffic determining module 420 may be all integrated into a physical device having a sending and receiving function and a processing function, the obtaining module 400 may be implemented using a transceiver, and the segment node determining module 410 and the service traffic determining module 420 may be implemented using one or more processors. Further, as shown in FIG. 5, the network service transmission device 500 may include a processor 510, a transceiver 520, and a memory 530. The memory 530 may be configured to store a program or code pre-installed in the device 500 at delivery, or may be configured to store code executed by the processor 510, or the like.

The processor 510 may be a general-purpose Central Processing Unit (CPU), a microprocessor, an Application-Specific Integrated Circuit (ASIC), or one or more integrated circuits to perform a related operation, to implement the technical solutions provided in the embodiments of the present disclosure.

It should be noted that the device 500 shown in FIG. 5 shows only the processor 510, the transceiver 520, and the memory 530. However, in a specific implementation process, a person skilled in the art should understand that the device 500 further includes another device that is essential for implementing normal running. In addition, based on a specific requirement, a person skilled in the art should understand that the device 500 may further include a hardware component for implementing another additional function. In addition, a person skilled in the art should understand that the device 500 may include only components or modules essential for implementing this embodiment of this application, but not necessarily include all the components shown in FIG. 5.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a computer disk-read only memory (CD-ROM), an optical memory, and the like) that include computer-usable program code.

The embodiments of this application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to embodiments of this application without departing from the spirit and scope of this application. This application is intended to cover these modifications and variations provided that they fall within the scope of protection defined by the following claims and their equivalent technologies.

What is claimed is:

1. A network service transmission method, comprising:
obtaining network topology information and network service information, wherein the network topology information comprises nodes in a network and a connection relationship between the nodes, and wherein the network service information comprises:
traffic information of a network service that is to be transmitted;
a source node to transmit the network service; and
a destination node that to transmit the network service;
determining a node centrality of each node in a set of other nodes not including the source node and the destination node based on the network topology information and both of the source node and the destination node, wherein the node centrality indicates a possibility that a shortest transmission path between the source node and the destination node not including the source node and the destination node passes through a node, wherein the set of other nodes does not comprise the source node and the destination node, and wherein second nodes in the set of other nodes are part of the nodes in the network;
determining at least one segment node in the set of other nodes based on the node centrality, wherein the at least one segment node is an intermediate node that shortest transmission paths of the network service passes through;
determining, based on each of the source node of the network service, the destination node of the network service and the at least one segment node, at least one transmission path used to transmit the network service; and
determining, based on the traffic information of the network service and the at least one transmission path, traffic of a network service that is to be transmitted on the at least one transmission path.

2. The network service transmission method of claim 1, wherein determining the at least one segment node based on the node centrality comprises:
- sorting each of the nodes based on values of the node centrality to obtain third nodes ranked top K; and
- determining the third nodes as the at least one segment node, wherein K is a positive integer greater than or equal to 1.

3. The network service transmission method of claim 1, wherein the node centrality satisfies the following expression:

$$\delta(v) = \sum_{s,t \in V | s \neq v \neq t} \frac{\sigma_{st}(v)}{\sigma_{st}},$$

wherein V represents the nodes in the network, wherein v represents any node in the set of other nodes, wherein s represents the source node configured to transmit the network service, wherein t represents the destination node configured to receive the network service, wherein $\delta(v)$ represents a node centrality of v, wherein $\sigma_{st}$ represents a quantity of shortest transmission paths between the s and the t in the network, and wherein $\sigma_{st}(v)$ is represents a quantity of shortest transmission paths passing through the v in the $\sigma_{st}$ shortest transmission paths.

4. The network service transmission method of claim 1, wherein the node centrality satisfies the following expression:

$$\delta(v) = \frac{|v^- + v^+|}{2}, v \in V',$$

wherein v represents any node in the set of other nodes, wherein V' represents the set of other nodes, wherein a node in the set of other nodes comprises a node that the shortest transmission paths of the network service passes through other than the source node and the destination node, wherein $\delta(v)$ represents a node centrality of v, wherein $v^-$ represents a quantity of nodes in the network that are in ingress connection to v, and wherein $v^+$ represents a quantity of nodes in the network that are in egress connection to v.

5. The network service transmission method of claim 1, wherein determining the at least one segment node based on the node centrality comprises:
- determining, based on the node centrality, a group centrality of each node group comprised in the set of other nodes, wherein each of the node groups comprises J nodes, and wherein J is a positive integer greater than or equal to 1;
- selecting a node group comprising a largest group centrality from the node groups; and
- determining the J nodes that comprise the largest group centrality as the at least one segment node.

6. The network service transmission method of claim 5, wherein the group centrality of each node group satisfies the following expression:

$$\delta(C) = \sum_{s,t \in V | s \neq v \neq t} \frac{\sigma_{st}(C)}{\sigma_{st}},$$

wherein V represents all the nodes in the network, wherein C represents a node group in the set of other nodes, wherein S represents a source node configured to transmit the network service, wherein t represents a destination node configured to receive the network service, wherein $\delta(C)$ represents a group centrality of C, wherein $\sigma_{st}$ represents a quantity of shortest transmission paths between the s and the t in the network, and wherein $\sigma_{st}(C)$ represents a sum of a quantity of paths passing through each of the nodes in the C in the $\sigma_{st}$ shortest transmission paths.

7. The network service transmission method of claim 1, wherein determining, the traffic of a network service that is be transmitted on the at least one transmission path comprises:
- determining a traffic splitting ratio of the network service that is to be transmitted on the at least one transmission path; and
- determining, based on the traffic splitting ratio, the traffic of the network service that is to be transmitted on the at least one transmission path.

8. The network service transmission method of claim 7, wherein the traffic splitting ratio of the network service that is to be transmitted on the at least one transmission path satisfies the following expression:

$$\min \theta,$$

$$\sum_{f \in F} \sum_{t \in T_f} \sum_{s \in S_t} \sum_{p \in P_S} x_{f,t} \cdot D_f \frac{I_{p,e}}{P_S} \leq \theta \cdot C_e, \forall e \in E,$$

$$0 \leq x_{f,t} \leq 1, \forall f \in F, t \in T_f,$$

$$\sum_{t \in T_f} x_{f,t} = 1, \forall f \in F,$$

wherein E represents an edge set in the network, wherein each edge in the edge set represents a direct connection relationship between two nodes in the network, wherein e represents an edge in the network, wherein F represents the traffic information of the network service that is to be transmitted, wherein f represents traffic information on a path that is used to transmit a network service, wherein $T_f$ represents a set of paths that are used to transmit the network service, wherein t represents one path of the network service, wherein $S_t$ represents a set of segment paths that are used to transmit the network service, wherein each segment path is between the source node and the intermediate node or a path between the intermediate node and the destination node, wherein s represents each of the segment paths, wherein $P_S$ represents a set of shortest segment paths, wherein a shortest segment path of the set of segment paths is a shortest path between the source node and the intermediate node or a shortest path between the intermediate node and the destination node, wherein P represents the shortest segment path, wherein $x_{f,t}$ represents a traffic splitting ratio, wherein $D_f$ represents a bandwidth requirement of the traffic information f, wherein $I_{p,e}$ represents a possibility that an edge e is an edge in the shortest segment path, wherein $C_e$ represents a value of maximum service traffic that the edge e can carry, and wherein $\theta$ represents a preset ratio value.

9. A network service transmission system, comprising:
- a memory comprising computer instructions; and
- a processor coupled to the memory and configured to execute the computer instructions, wherein the computer instructions cause the processor to be configured to:
  - obtain network topology information and network service information, wherein the network topology information comprises nodes in a network and a connection relationship between the nodes, wherein the network service information comprises:
  traffic information of a network service that is to be transmitted;
  a source node that is configured to transmit the network service; and
  a destination node that is configured to transmit the network service;
determine a node centrality of each node in a set of other nodes other than the source node and the destination node based on the network topology information and both of the source node and the destination node, wherein the node centrality to indicates a possibility that a shortest transmission path between the source node and the destination node not including the source node and the destination node passes through a node, wherein the set of other nodes does not comprise the source node and the destination node, and wherein second nodes in the set of other nodes are part of the nodes in the network;
determine at least one segment node in the set of other nodes based on the node centrality, wherein the at least one segment node is an intermediate node that shortest transmission paths of the network service passes through;
determine, based on each of the source node of the network service, the destination node of the network service, and the at least one segment node, at least one transmission path used to transmit the network service; and
determine, based on the traffic information of the network service and the at least one transmission path, traffic of a network service that is to be transmitted on the at least one transmission path.

10. The network service transmission system of claim 9, wherein the computer instructions to determine the at least one segment node based on the node centrality cause the processor to be configured to:
  sort each of the nodes based on values of the node centrality to obtain third nodes ranked top K; and
  determine the third nodes as the at least one segment node, wherein K is a positive integer greater than or equal to 1.

11. The network service transmission system of claim 9, wherein the node centrality satisfies the following expression:

$$\delta(v) = \sum_{s,t \in V | s \neq v \neq t} \frac{\sigma_{st}(v)}{\sigma_{st}},$$

wherein V represents the nodes in the network, wherein v represents any node in the set of other nodes, wherein s represents a source node configured to transmit the network service, wherein t represents the destination node that is configured to receive the network service, wherein δ(v) to represents a node centrality of v, wherein $\sigma_{st}$ represents a quantity of shortest transmission paths between the s and the t in the network, wherein $\sigma_{st}(v)$ represent a quantity of shortest transmission paths passing through the v in the $\sigma_{st}$ shortest transmission paths.

12. The network service transmission system of claim 9, wherein the node centrality satisfies the following expression:

$$\delta(v) = \frac{|v^- + v^+|}{2}, v \in V',$$

wherein v represents any node in the set of other nodes, wherein V' represents the set of other nodes, wherein a node in the set of other nodes comprises a node that the shortest transmission paths of the network service passes through other than the source node and the destination node, wherein δ(v) represents a node centrality of v, wherein $v^-$ represents a quantity of nodes in the network that are in ingress connection to v, and wherein $v^+$ represents a quantity of nodes in the network that are in egress connection to v.

13. The network service transmission system of claim 9, wherein the computer instructions to determine the at least one segment node based on the node centrality further cause the processor to be configured to:
  determine, based on the node centrality, a group centrality of each node group comprised in the set of other nodes, wherein each of the node groups comprises J nodes, and wherein J is a positive integer greater than or equal to 1;
  select a node group comprising a largest group centrality from the node groups; and
  determine the J nodes that comprise the largest group centrality as the at least one segment node.

14. The network service transmission system of claim 13, wherein the group centrality of each node group satisfies the following expression:

$$\delta(C) = \sum_{s,t \in V | s \neq v \neq t} \frac{\sigma_{st}(C)}{\sigma_{st}},$$

wherein V represents the nodes in the network, wherein C represents a node group in the set of other nodes, wherein s represents a source node configured to transmit the network service, wherein t represents a destination node configured to receive the network service, wherein δ(C) represents a group centrality of C, wherein $\sigma_{st}$ represents a quantity of shortest transmission paths between the s and the t in the network, and wherein $\sigma_{st}(C)$ represents a sum of a quantity of paths passing through each of the nodes in the C in the $\sigma_{st}$ shortest transmission paths.

15. The network service transmission system of claim 9, wherein the computer instructions to determine, based on the traffic information of the network service and the at least one transmission path, the traffic of the network service that is to be transmitted on the at least one transmission path further cause the processor to be configured to:
  determine a traffic splitting ratio of the network service that is to be transmitted on the at least one transmission path; and
  determine, based on the traffic splitting ratio, the traffic of the network service that is to be transmitted on the at least one transmission path.

16. The network service transmission system of claim 15, wherein the traffic splitting ratio of the network service that is to be transmitted on the at least one transmission path satisfies the following expression:

$$\min \theta,$$

$$\sum_{f \in F} \sum_{t \in T_f} \sum_{s \in S_t} \sum_{p \in P_S} x_{f,t} \cdot D_f \frac{I_{p,e}}{P_S} \leq \theta \cdot C_e, \forall e \in E,$$

$$0 \leq x_{f,t} \leq 1, \forall f \in F, t \in T_f,$$

$$\sum_{t \in T_f} x_{f,t} = 1, \forall f \in F,$$

wherein E represents an edge set in the network, wherein each edge in the edge set represents a direct connection relationship between two nodes in the network, wherein e to represents an edge in the network, wherein F represents the traffic information of the network service that is to be transmitted, wherein f represents traffic information on a path that is used to transmit a network service, wherein $T_f$ represents a set of paths that are used to transmit the network service, wherein t represents a path of the network service, wherein $S_t$ represents a set of segment paths that are used to transmit the network service, wherein each of the segment paths is between the source node and the intermediate node or a path between the intermediate node and the destination node, wherein s represents each of the segment paths, wherein $P_S$ represents a set of shortest segment paths, wherein a shortest segment path of the set of segment paths is a shortest path between the source node and the intermediate node or a shortest path between the intermediate node and the destination node, wherein p represents the shortest segment path, wherein $x_{f,t}$ represents a traffic splitting ratio, wherein $D_f$ represents a bandwidth requirement of the traffic information f, wherein $I_{p,e}$ represents a possibility that an edge e is an edge in the shortest segment path, wherein $C_e$ represents a value of maximum service traffic that the edge e can carry, and wherein θ represents a preset ratio value.

17. A computer program product comprising a non-transitory computer readable storage medium for implementing a network service transmission method, comprising computer instructions that, when executed by a processor, causes the processor to:
obtain network topology information and network service information, wherein the network topology information comprises nodes in a network and a connection relationship between the nodes, and wherein the network service information comprises:
traffic information of a network service that is to be transmitted;
a source node that is configured to transmit the network service; and
a destination node that is configured to transmit the network service;
determine a node centrality of each node in a set of other nodes not including the source node and the destination node based on the network topology information and both of the source node and the destination node, wherein the node centrality indicates a possibility that a shortest transmission path between the source node and the destination node not including the source node and the destination node passes through a node, wherein the set of other nodes does not comprise the source node and the destination node, and wherein the nodes in the set of other nodes are part of the nodes in the network;
determine at least one segment node in the set of other nodes based on the node centrality, wherein the at least one segment node is an intermediate node that shortest transmission paths of the network service pass through;
determine, based on each of the source node and the destination node of the network service and the at least one segment node, at least one transmission path that is used to transmit the network service; and
determine, based on the traffic information of the network service and the at least one transmission path that is used to transmit the network service, traffic of a network service that is to be transmitted on the at least one transmission path.

18. The computer program product of claim 17, wherein the computer instructions to determine at least one segment node in the set of other nodes based on the node centrality further cause the processor to:
sort the nodes in the set of other nodes based on values of node centralities to obtain nodes ranked top K; and
determine the nodes ranked top K as the at least one segment node, wherein K is a positive integer greater than or equal to 1.

19. The computer program product of claim 17, wherein the node centrality satisfies the following expression:

$$\delta(v) = \sum_{s,t \in V | s \neq v \neq t} \frac{\sigma_{st}(v)}{\sigma_{st}},$$

wherein V represents a set of all nodes in the network, wherein v represents any node in the set of other nodes, wherein s represents a source node configured to transmit the network service, wherein t represents the destination node configured to receive the network service, wherein δ(v) represents a node centrality of v, wherein $\sigma_{st}$ represents a quantity of shortest transmission paths between the s and the t in the network, and wherein $\sigma_{st}(v)$ represents a quantity of shortest transmission paths passing through then v in the $\sigma_{st}$ shortest transmission paths.

20. The computer program product of claim 17, wherein the node centrality satisfies the following expression:

$$\delta(v) = \frac{|v^- + v^+|}{2}, v \in V',$$

wherein v represents any node in the set of other nodes wherein V' represents the set of other nodes, wherein a node comprised in the set of other nodes comprises a node that the shortest transmission paths of the network service passes through other than the source node and the destination node, wherein δ(v) represents a node centrality of v, wherein $v^-$ represents a quantity of nodes in the network that are in ingress connection to v, and wherein $v^+$ represents a quantity of nodes in the network that are in egress connection to v.

* * * * *